(12) United States Patent
Frank et al.

(10) Patent No.: US 7,454,979 B2
(45) Date of Patent: Nov. 25, 2008

(54) LINEAR POSITION SENSOR

(75) Inventors: Ronald I. Frank, Sharon, MA (US);
Matthew Laplaca, Cumberland, RI (US); Thomas Kemper, Wayland, MA (US); Tom Tran, Stoughton, MA (US); Steve Strobel, Cranston, RI (US)

(73) Assignee: Stoneridge Control Devices, Inc., Canton, MA (US)

( * ) Notice: Subject to any disclaimer, the term of this patent is extended or adjusted under 35 U.S.C. 154(b) by 1 day.

(21) Appl. No.: 11/419,632

(22) Filed: May 22, 2006

(65) Prior Publication Data
US 2007/0012118 A1    Jan. 18, 2007

Related U.S. Application Data

(60) Provisional application No. 60/683,226, filed on May 20, 2005.

(51) Int. Cl.
*G01B 7/14* (2006.01)

(52) U.S. Cl. .............. 73/779; 73/862.392; 73/862.393; 73/862.451; 73/862.471; 324/207.2; 324/207.11; 324/207.24

(58) Field of Classification Search .......... 73/779, 73/862.392, 862.393, 862.451, 862.471; 324/207.2, 207.11, 207.24
See application file for complete search history.

(56) References Cited

U.S. PATENT DOCUMENTS

| | | | | |
|---|---|---|---|---|
| 5,988,000 A | * | 11/1999 | Adams | 73/862.044 |
| 6,356,072 B1 | * | 3/2002 | Chass | 324/207.2 |
| 6,400,145 B1 | * | 6/2002 | Chamings et al. | 324/207.26 |
| 6,655,710 B2 | * | 12/2003 | Lindell et al. | 280/419 |
| 6,729,194 B2 | * | 5/2004 | Kaijala et al. | 73/862.69 |
| 6,851,503 B2 | * | 2/2005 | Almaraz et al. | 180/268 |
| 6,978,687 B2 | * | 12/2005 | Barnabo et al. | 73/862.393 |
| 7,014,005 B2 | * | 3/2006 | Martinez et al. | 180/268 |
| 7,190,159 B2 | * | 3/2007 | Galbreath et al. | 324/207.2 |
| 7,199,578 B2 | * | 4/2007 | Rohner et al. | 324/207.2 |
| 7,276,898 B2 | * | 10/2007 | Rosplock | 324/207.2 |
| 2003/0155166 A1 | * | 8/2003 | Sullivan et al. | 180/268 |
| 2004/0016304 A1 | * | 1/2004 | Kaijala et al. | 73/862.69 |
| 2004/0227638 A1 | * | 11/2004 | Frank et al. | 340/687 |
| 2004/0231436 A1 | * | 11/2004 | Barnabo et al. | 73/862.391 |
| 2005/0248337 A1 | * | 11/2005 | Rohner et al. | 342/207.2 |

* cited by examiner

*Primary Examiner*—Edward Lefkowitz
*Assistant Examiner*—Freddie Kirkland, III
(74) *Attorney, Agent, or Firm*—Grossman, Tucker, Perreault & Pfleger, PLLC

(57) ABSTRACT

A load sensor includes a housing and a magnet carrier axially movable within the housing. A first and a second magnet are coupled to the magnet carrier in an axially spaced apart arrangement and oriented to provide repelling magnetic fields. The magnet carrier and the first and second magnets are axially movable relative to the magnetic field sensor, and the magnetic field sensor is configured to provide an output that is indicative of the position of the magnetic filed sensor relative to the first and second magnets.

20 Claims, 10 Drawing Sheets

SECTION A-A

LINEAR POSITION SENSOR

CROSS-REFERENCE TO RELATED APPLICATIONS

This application claims the benefit of U.S. provisional patent application Ser. No. 60/683,226, filed May 20, 2005, the entire disclosure of which is incorporated herein by reference.

FIELD

The present disclosure generally pertains to position sensor systems, and is more particularly directed at non-contact linear position sensor systems.

BACKGROUND

Tractors, such as those used for agriculture, construction, etc. are typically configured to operate or use a variety of implements and attachments, such as ploughs, sprayers, etc. A number of hitch arrangements have been developed to allow the interchangeable connection between a tractor any various different implements and attachments. One common connection arrangement is a three point hitch, which may generally include two outer arms and a single center arm which may be connected between the tractor and the implement. The two outer arms are often hydraulically movable for raising, lowering, and in some cases, tilting the implement or attachment. The orientation of the implement and the load transferred to the working surface may be controlled by the dimensions and orientation of the arms, and the lift applied to the arms by the hydraulic system.

BRIEF DESCRIPTION OF THE DRAWINGS

Features and advantages of the present invention are set forth by way of description of embodiments consistent therewith, which description should be considered in conjunction with the accompanying drawings, wherein.

DETAILED DESCRIPTION

The present disclosure generally relates to a linear position sensor. According to particular embodiments consistent with the present disclosure the linear position sensor may utilize two or more magnets oriented to provide repelling magnetic fields. A magnetic field sensor, such as a Hall effect sensor, may be disposed within the repelling magnetic fields of the magnets. The Hall effect sensor may provide an output generally corresponding to a position of the Hall effect sensor within the repelling magnetic fields of the magnets. Consistent with the present disclosure, a sensor may be provided in which the magnetic flux through the Hall effect sensor has an increased linearity relative to travel of the Hall effect sensor within the repelling magnetic fields. According to one embodiment, a position sensor consistent with the present disclosure may be used in connection with a hitch bar assembly of a tractor, for example, to measure a load experienced by the hitch bar assembly.

Figure 1:
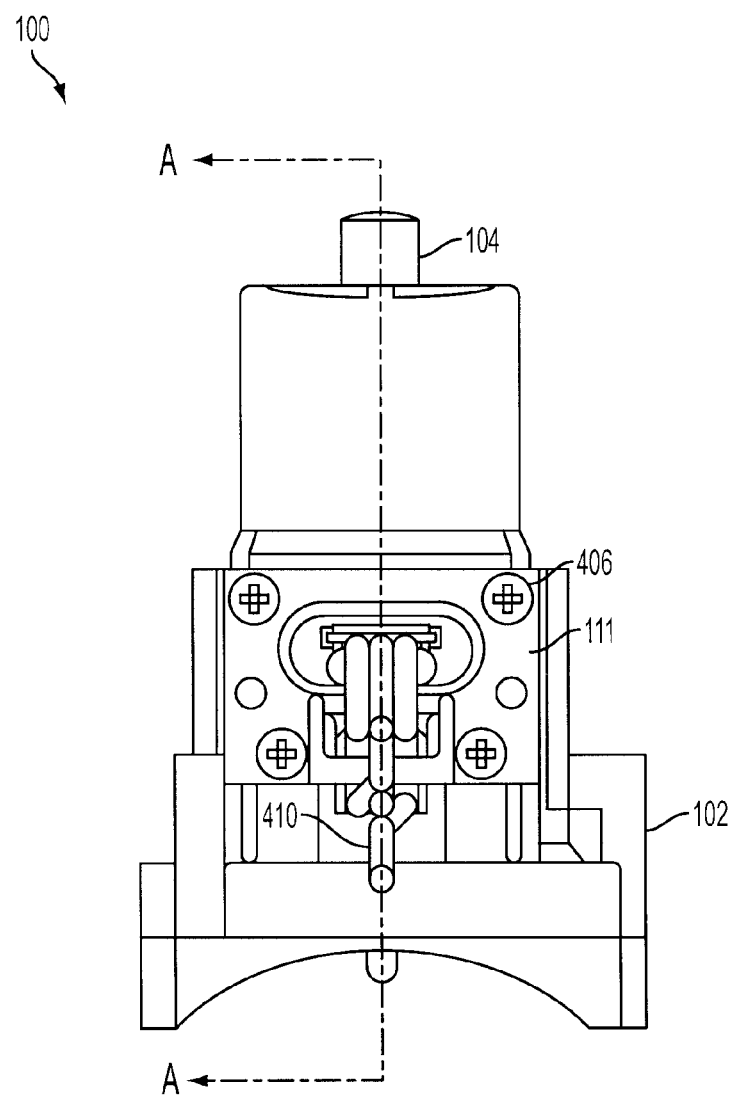
FIG. 1 shows an embodiment of a position sensor consistent with the present disclosure in a side elevation.
Figure 2:
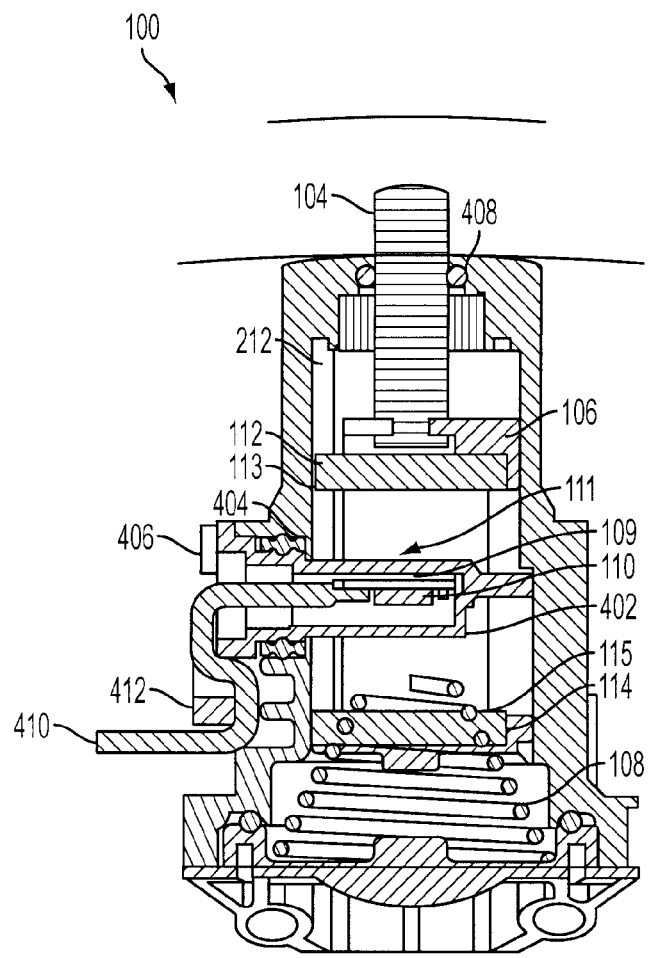
FIG. 2 is a sectional view of the position sensor depicted in FIG. 1.

Referring to FIGS. 1 and 2, an embodiment of a position sensor 100 consistent with the present disclosure is depicted. The sensor 100 may include a housing 102 and an axially movable plunger 104. The plunger 104 may be coupled to a magnet carrier 106, which may be biased toward a first position relative to the housing 102, for example by a compression spring 108, or similar biasing element. The plunger 104 and magnet carrier 106 may be axially movable within the housing 102 against and/or with the biasing force of the spring 108.

The sensor 100 may further include a magnetic field sensor, such as a Hall effect sensor 110, disposed between two magnets 112, 114 which are spaced apart along an axis. The two magnets may be disposed on, or coupled to, the magnet carrier 106. As illustrated, the Hall effect sensor 110 may be housed in an electronics package 111. The magnets 112, 114 may be oriented to provide repelling magnetic fields. Additionally, each magnet may be provided with a magnetic field alignment device 113, 115. The Hall effect sensor 110 may provide an output corresponding to the position of the Hall effect sensor 110 relative to each of the magnets 112, 114. When the magnet carrier 106 is axially moved to a position within the housing 102 the Hall effect sensor 110 may provide an output corresponding to the position of the Hall effect sensor 110 relative to each of the magnets 112, 114. The output of the Hall effect sensor may correspond to the position of the plunger 104 and/or magnet carrier 106 relative to the housing 102 and to the Hall effect sensor 110.

Figure 3:
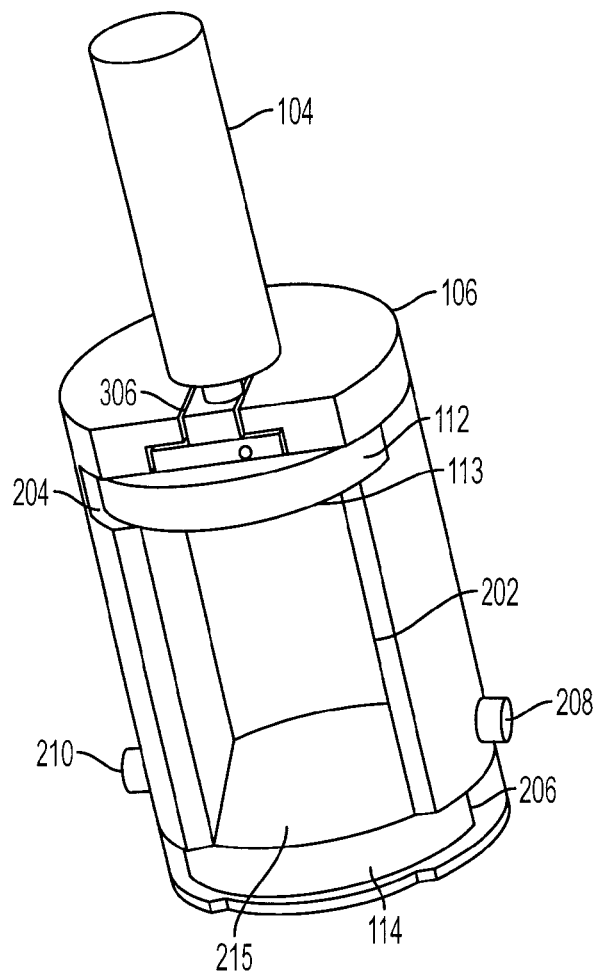
FIG. 3 depicts, in perspective view, an embodiment of a magnet carrier that may suitably be used in connection with a position sensor consistent with the present disclosure.

Turning to FIG. 3, an embodiment of a plunger 104 and magnet carrier 106 are depicted. As shown the magnet carrier 106 may define an opening 202 extending through the magnet carrier 106. Respective magnets 112, 114 may be disposed generally adjacent to either end of the opening 202 defined through the magnet carrier 106. Consistent with the sensor 100 depicted in FIGS. 1 and 2, when the sensor 100 is assembled the Hall effect sensor 110 may be disposed at least partially within the opening 202 in the magnet carrier 106, thereby placing the Hall effect sensor at least partially within the magnetic field of the magnets 112, 114. Furthermore, the magnet carrier 106 may be axially movable relative to the Hall effect sensor, while the Hall effect sensor 110 is disposed within the opening 202.

As depicted, in one embodiment the magnet carrier 106 may include respective slots 204, 206 adjacent to opposed ends of the opening 202. The slots 204, 206 may be sized to at least partially receive the magnets 112, 114 therein. In such an embodiment, the magnets 112, 114 may be at least axially retained in position in the magnet carrier 106 relative to the opening 202. The magnets 112, 114 may be further secured in position using an adhesive, mechanical fastener, press fit, etc. According to an alternative embodiment, the magnets may be mechanically and/or adhesively fastened at respective locations relative to the opening without the use of slots.

According to an embodiment consistent with the present disclosure, the magnet carrier 106 may include one or more alignment features, such as pegs 208, 210. The pegs 208, 210 may cooperate with corresponding features, such as a slot 212, in the housing 102. The cooperation between the pegs 208, 210 and the slot 212 may provide mechanical alignment between the magnet carrier 106 and the housing 102. Mechanical alignment between the magnet carrier 106 and the housing 102 may, for example, prevent the magnet carrier 106 from twisting which could cause the magnet carrier 106 to rub and/or bind on the electronics package 111. Rubbing and/or binding between the electronics package 111 and the magnet carrier 106 may impede movement of the magnet carrier 106 in the housing 102 and/or may damage and/or displace the Hall effect sensor 110 and/or the electronics package 111. According to one embodiment, the slot 212 in the sensor housing 102 may provide a bearing surface facilitating smooth movement of the pegs 208, 110 in the slots 212.

Figure 4:
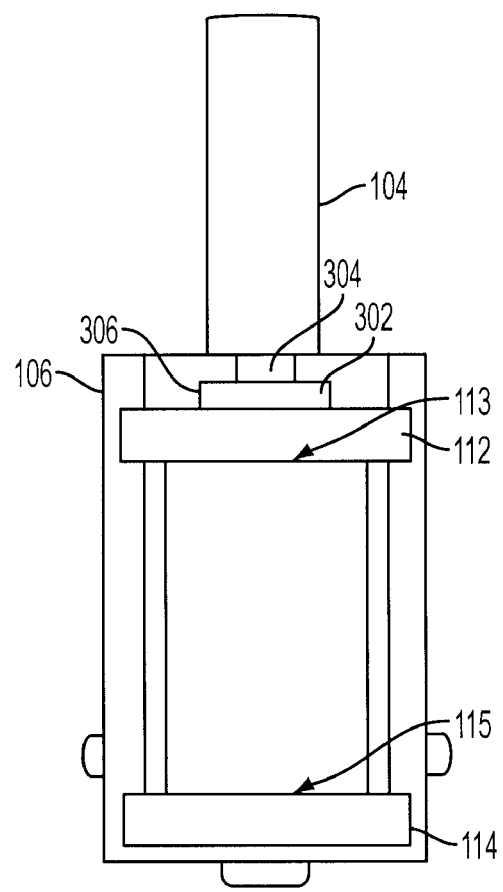
FIG. 4 is a side elevation view of an embodiment of a magnet carrier that may suitably be used in connection with a position sensor consistent with the present disclosure.

With reference to FIG. 4, an embodiment of a plunger 104 coupled to a magnet carrier 106 is depicted. Consistent with the illustrated embodiment, the plunger 104 may include T-cross-section adjacent one end thereof. The T-cross-section may include a head portion 302 separated from the remainder of the plunger 104 by a reduced diameter neck 304. The magnet carrier 106 may include a cooperating T-slot 306 which may resist and/or limit axial movement of the plunger 104 relative to the magnet carrier 106. As shown in FIG. 3, the cooperating T-slot 306 in the magnet carrier 106 may be opened at one edge and/or portion of the magnet carrier 106 to provide a U-slot arrangement. The U-slot arrangement of the cooperating T-slot 306 in the magnet carrier 106 may allow the plunger 104 to be slidably coupled with the magnet carrier 106 by axially aligning the T-cross-section of the plunger 104 with the cooperating T-slot 306 of the magnet carrier 106 and slidably inserting the T-cross-section of the plunger 104 into the cooperating T-slot 306. Various assemblies and/or features may be employed to secure the plunger 104 and the magnet carrier 106. For example, a pin may be provided at least partially obstructing cooperating T-slot 306 against removal of the plunger 106. Furthermore, various additional and/or alternative arrangements may also suitable be employed to either directly and/or indirectly couple the plunger and the magnet carrier. For example, the plunger and magnet carrier may be threadably engaged to one another, may be press fit together, may be formed as an integral structure, etc.

Figure 5:
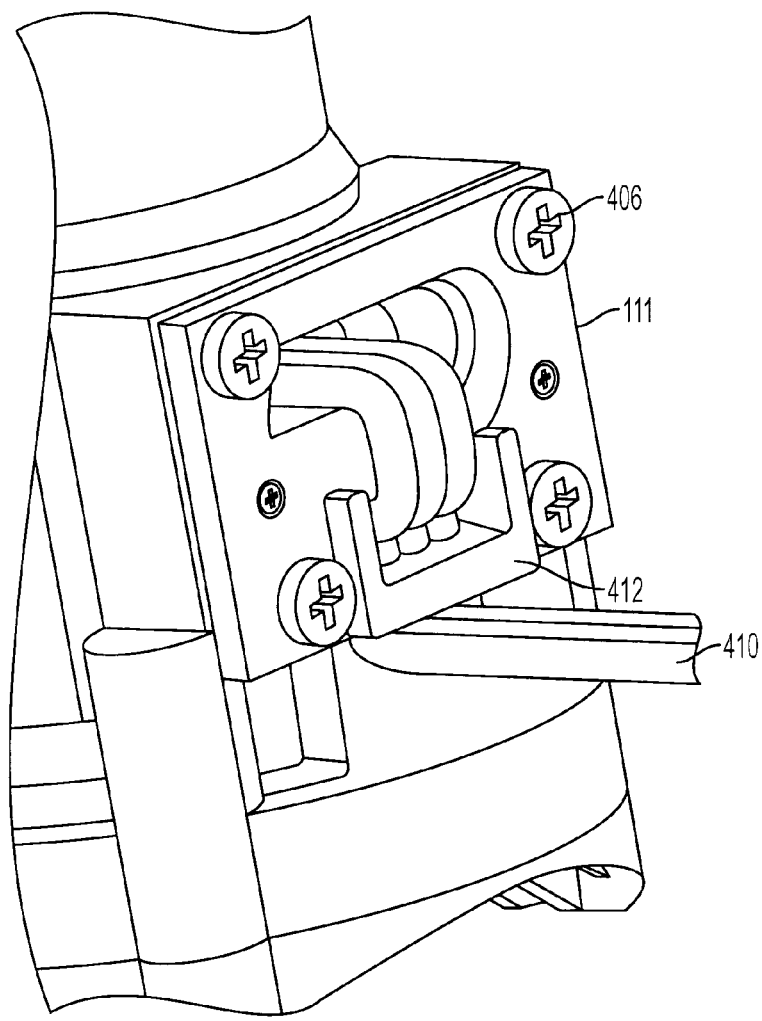
FIG. 5 shows a perspective view of a portion of an embodiment of a sensor consistent with the present disclosure, showing a strain relief configuration that may suitably be used in connection with the present disclosure.

With particular reference to FIGS. 1, 2 and 5, according to another aspect, the electronics of the sensor 100, such as the Hall effect sensor 110, may be isolated from the environment, e.g., via a hard wall protection arrangement. In an embodiment, the hard wall protection arrangement may be provided by at least partially encapsulating the electronics, such as a printed circuit board 109 including the Hall effect sensor 110, for example in an electronics package 111, as mentioned above. In one such embodiment, the electronics package 111 may include a shell 402. The electronics and printed circuit board 109 may be potted in the shell 402, e.g., using a thermoset and/or thermoplastic resin such as epoxy, polyester, etc. In other embodiments, the electronics, etc., may be overmolded to provide a an electronics package that may not include a shell portion, for example by insert injection molding over the electronics and/or printed circuit board using a thermoset and/or thermoplastic material.

As best seen in FIG. 2, the electronics package 111 may be disposed through an opening 404 in the sensor housing 102 and positioned within the opening 202 in the magnet carrier 106. The electronics package 111 may be secured to the sensor housing 102, for example, using screws 406, etc. The electronics package 111 may be directly attached to the sensor housing 102 and/or may include one or more seals which may further isolate the interior of the sensor 100 from the environment.

The use of a hard wall protection arrangement may provide enhance environment protection for the electronics, for example, as compared to a dynamic seal. Arrangements may be provided in which the hard wall protection may be used alone and/or in combination with a dynamic seal. For example, as also shown, the sensor 100 may also include a dynamic seal, such as an O-ring 408 The O-ring 408 may engage and/or seal against the plunger 104, to prevent and/or reduce the ingress of water, dirt, etc. into the interior of the sensor 100.

According to another aspect, electrical leads 410 from the electronics package 111 may be provided with mechanical strain relief. As shown in FIGS. 2 and 5, the leads 410 may pass under a portion of the electronics package 111, such as a brace 412 which may be formed as part of the electronics package 111. The leads 410 may be pinched between the brace 412 and the sensor housing 102 when the electronics package 111 is attached, e.g., screwed, to the housing 102. Consistent with such a configuration, at least a portion of a load applied to the leads 410 may be transferred to the sensor housing 102 and/or the electronics package 111. Accordingly, the load transferred to the electronics and/or printed circuit board may be reduced.

As mentioned, each of the magnets 112, 114 may be provided with a respective magnetic field alignment device 113, 115. According to one embodiment, the magnetic field alignment devices 113, 115 may be provided as steel pole pieces disposed in contact with and/or adjacent to each of the magnets 112, 114. As depicted, the magnetic field alignment devices 113, 115 may be provided as steel disks attached to respective faces of the magnets 112, 114. The magnetic field alignment devices 113, 115 associated with each magnet 112, 114 may increase the linearity of the magnetic flux through the Hall effect sensor 110 over the travel of the magnet carrier 106.

Consistent with one embodiment, the sensor 100 may be used to detect a load, e.g., on a three point hitch or draw bar. According to such an embodiment, the plunger 104 may be coupled for receiving a load, e.g., from a link of a three point hitch. The load applied to the plunger 104 may move the magnet carrier 106 against the bias of the spring 108. The movement of the magnet carrier 106, as may be detected by change in position of the magnets 112, 114 relative to the Hall effect sensor 110. The load applied to the plunger may be determined based on the movement of the magnet carrier 106 and the spring constant of the spring 108. Of course, a sensor consistent with the present disclosure may be use for a myriad of load sensing and position sensing application.

Figure 6:
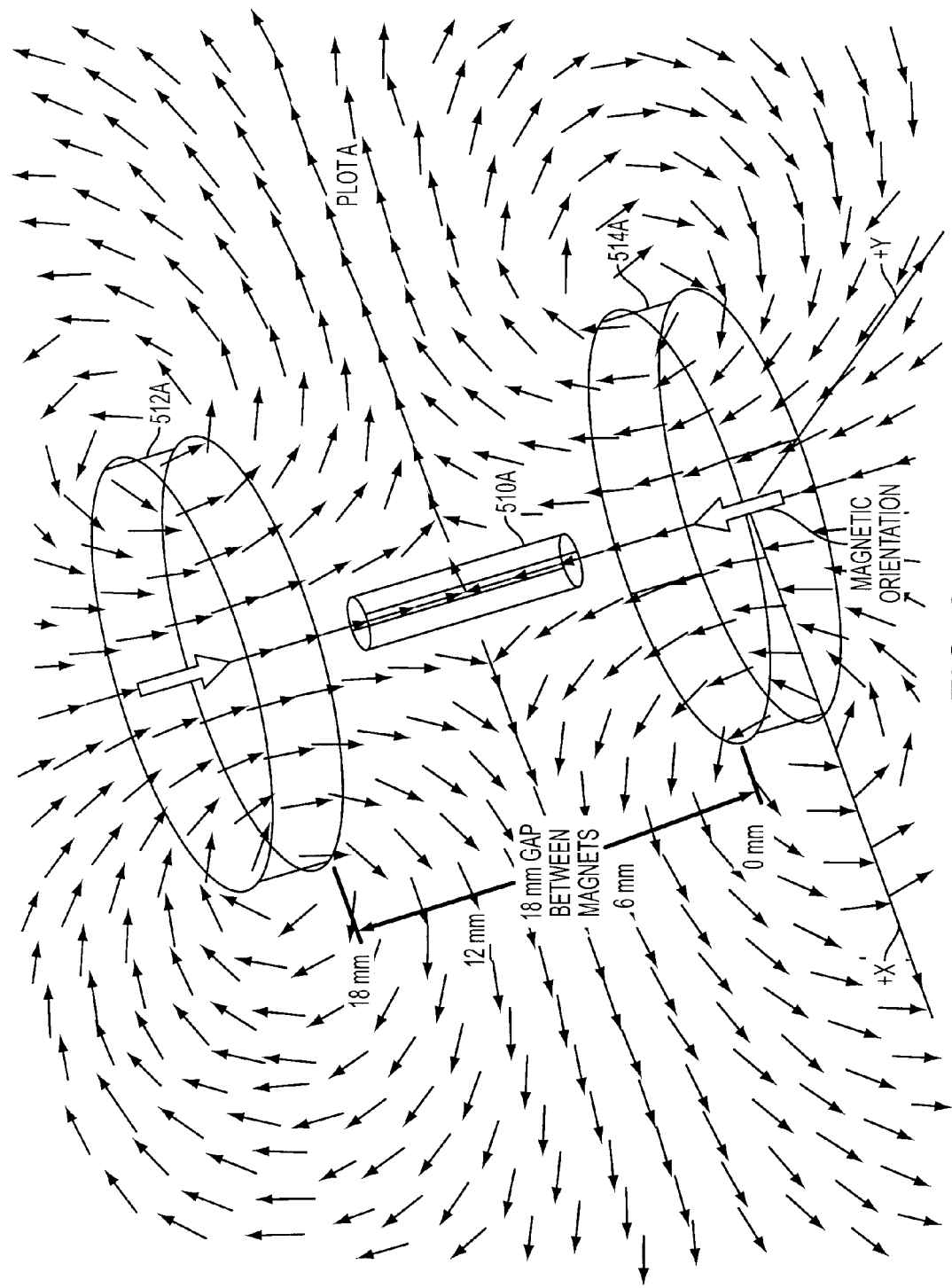
FIG. 6 is a magnetic field vector plot of a modeled embodiment of a repelling field position sensor arrangement not including magnetic field alignment devices.
Figure 7:
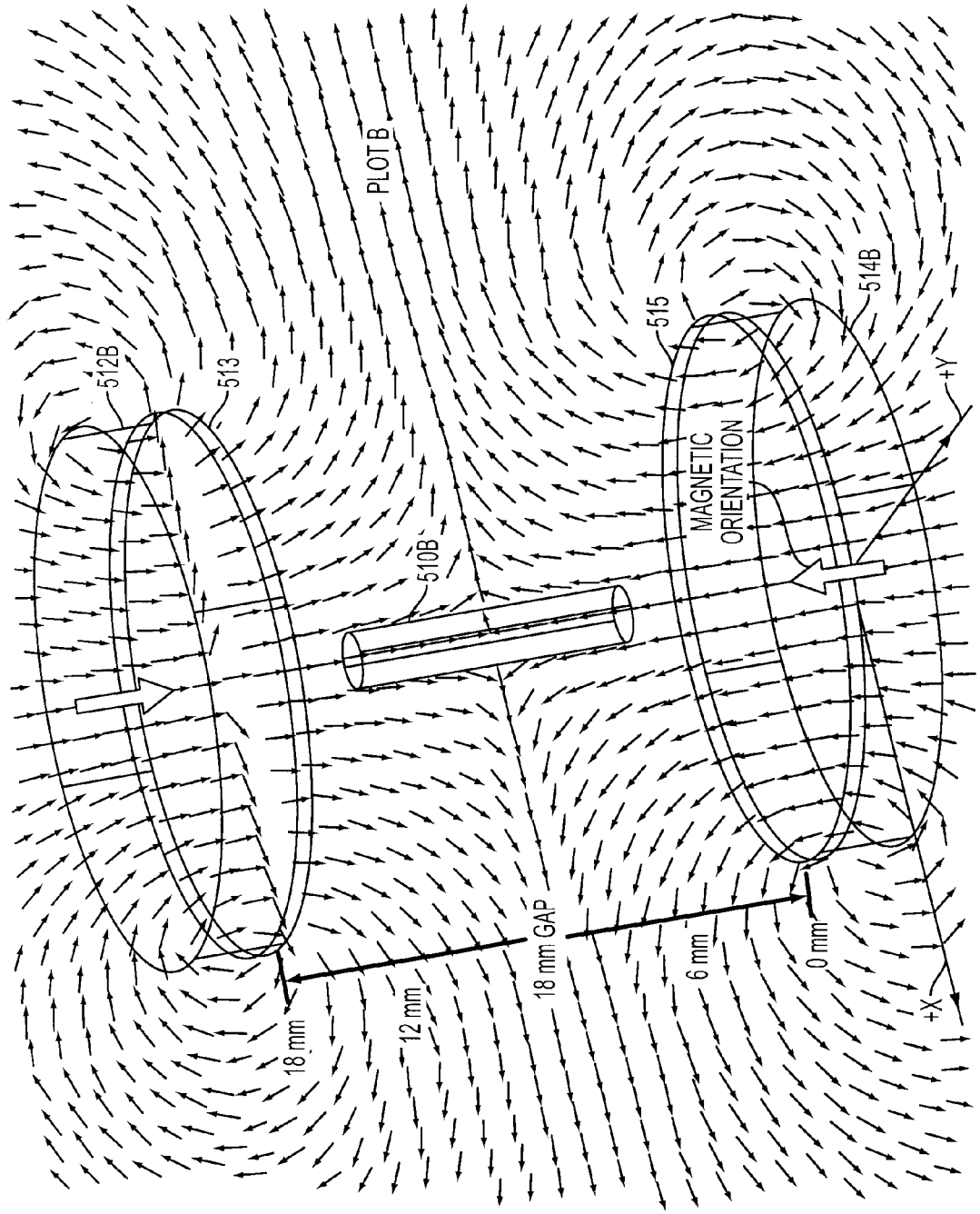
FIG. 7 is a magnetic field vector plot of a modeled embodiment of a repelling field position sensor arrangement including magnetic field alignment devices consistent with the present disclosure.
Figure 8:
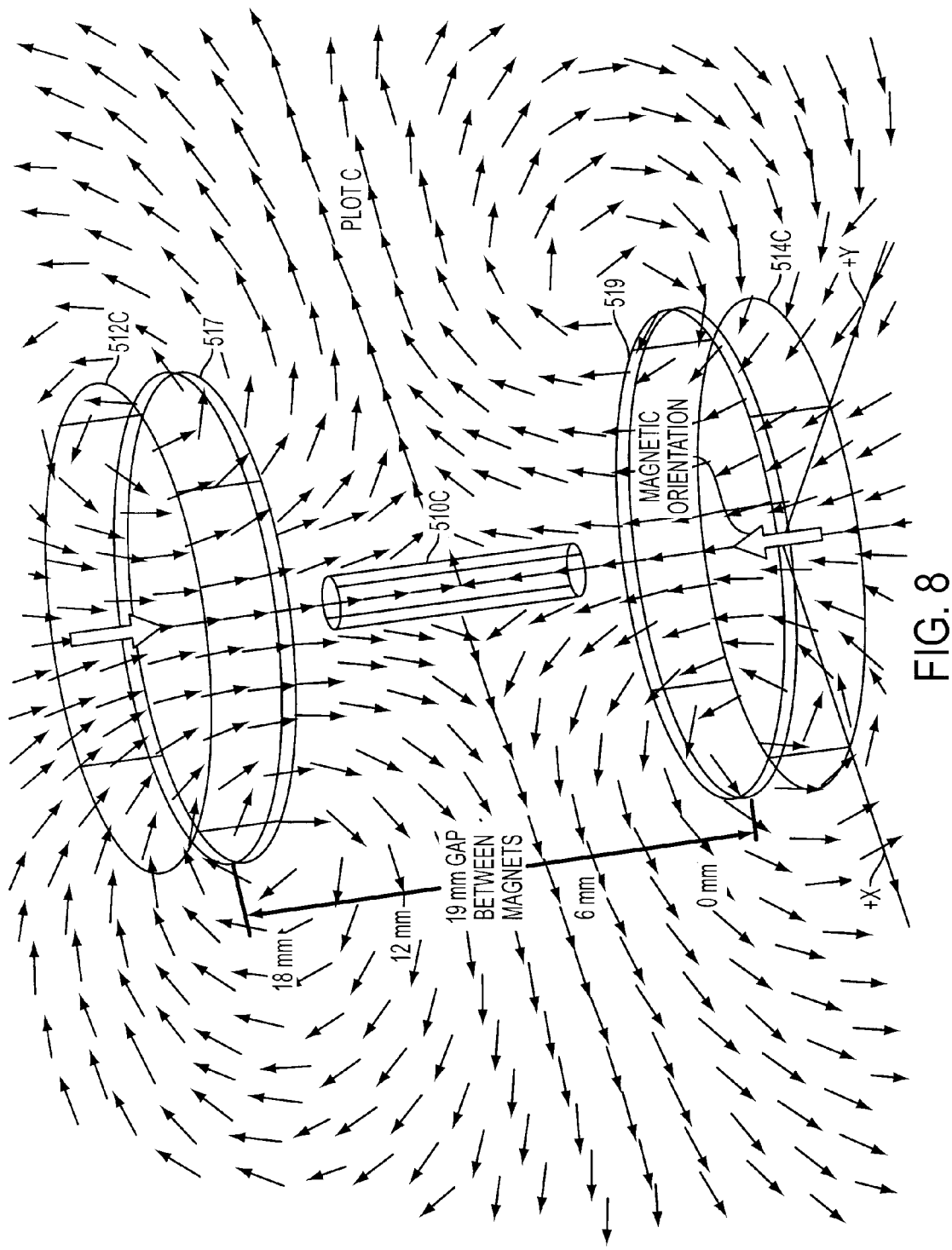
FIG. 8 is a magnetic field vector plot of another modeled embodiment of a repelling field position sensor arrangement not including magnetic field alignment devices.

FIGS. 6 through 8 depict magnetic field vector plots for three exemplary repelling magnet position sensor arrangements. The magnetic field vector plots shown in FIGS. 6 through 8 represent a possible theoretical model which may be consistent with the disclosed arrangement. However, it will be appreciated that in other theoretical models, as well as in actual embodiments, the magnetic field vectors may differ substantially from the plots shown in FIGS. 6 through 8. Accordingly, the present invention should not be construed as being limited by the depicted theoretical models. FIG. 6 depicts a magnetic field vector plot, designated PLOT A, for a repelling magnetic field position sensor arrangement including a magnetic field sensor 510A and two spaced apart magnets 512A, 514A, not including magnetic field alignment devices associated with the magnets. FIG. 7 depicts a magnetic field vector plot, designated PLOT B, for a repelling magnetic field sensor arrangement including a magnetic field sensor 510B and in which each of the magnets 512B, 514B include a magnetic field alignment device 513, 515, in the form of steel disks, associated with each of the magnets 512B, 514B, as consistent with the present invention. The spacing between the magnetic field alignment devices 513*m* 515 in the embodiment of PLOT B is the same as the magnet-to-magnet spacing of embodiment of PLOT A. FIG. 8 depicts a magnetic field vector plot, designated PLOT C, for a repelling magnetic field position sensor arrangement including a magnetic field sensor 510C and two spaced apart magnets 512C, 5414C, but not including magnetic field alignment devices. In the model of PLOTC, the regions which may correspond to magnetic field alignment devices were modeled as air gaps 517, 519. The magnet-to-magnet spacing of the embodiment of PLOT C is the same as the magnet-to-magnet spacing of the embodiment of PLOT B. While exemplary dimensions are provided associated with the magnets, magnet separation, magnetic field alignment devices and Hall devices in the illustrated embodiments, it should be appreciated that these dimensions are only provided for the sake of illustration. The dimensions of the magnets, magnet spacing, magnetic field alignment devices, etc., may all be varied widely within the scope of the present disclosure.

Figure 9:
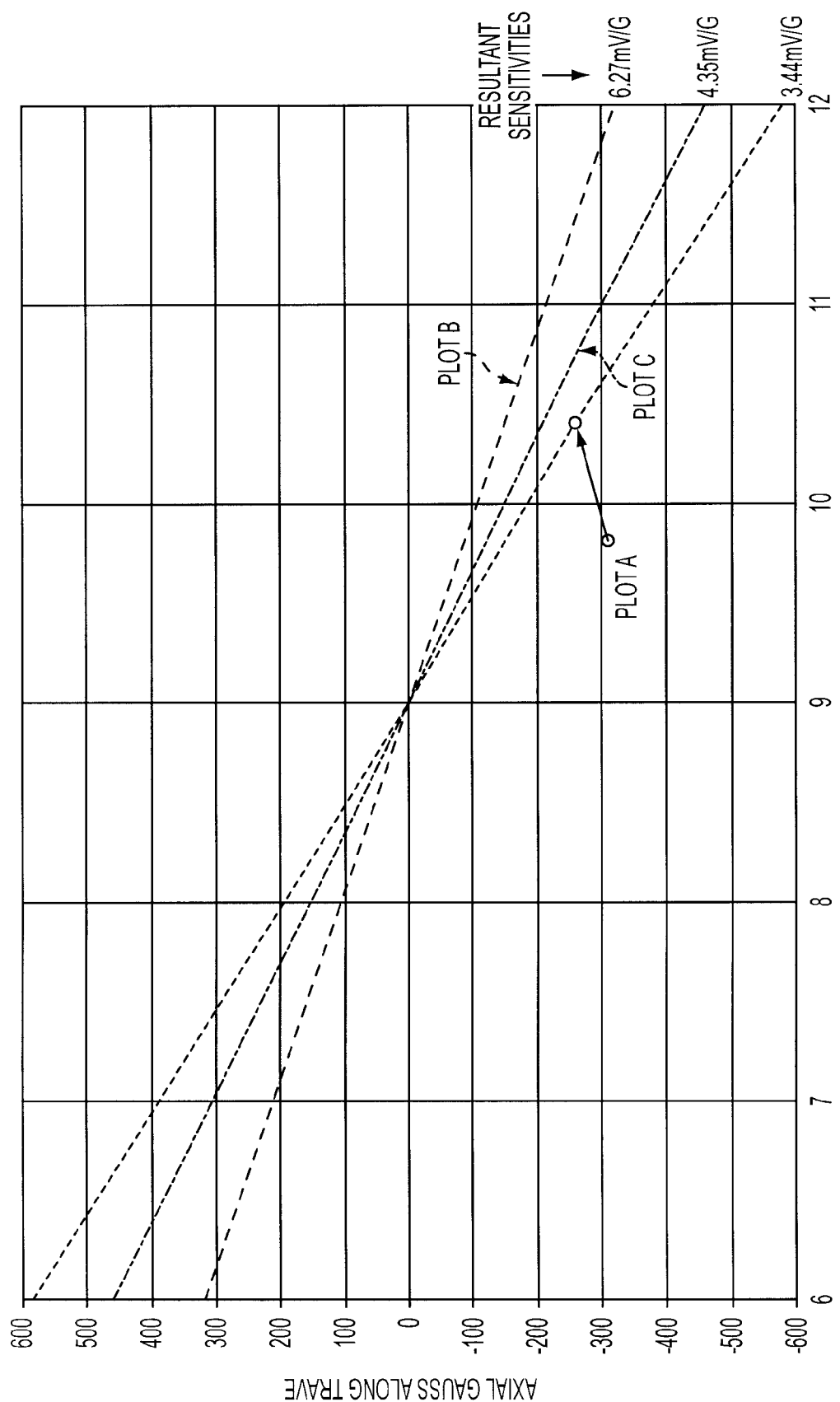
FIG. 9 is a plot of Axial Gauss versus Travel for each of the repelling field position sensor arrangements depicted in FIGS. 6 through 8.
Figure 10:
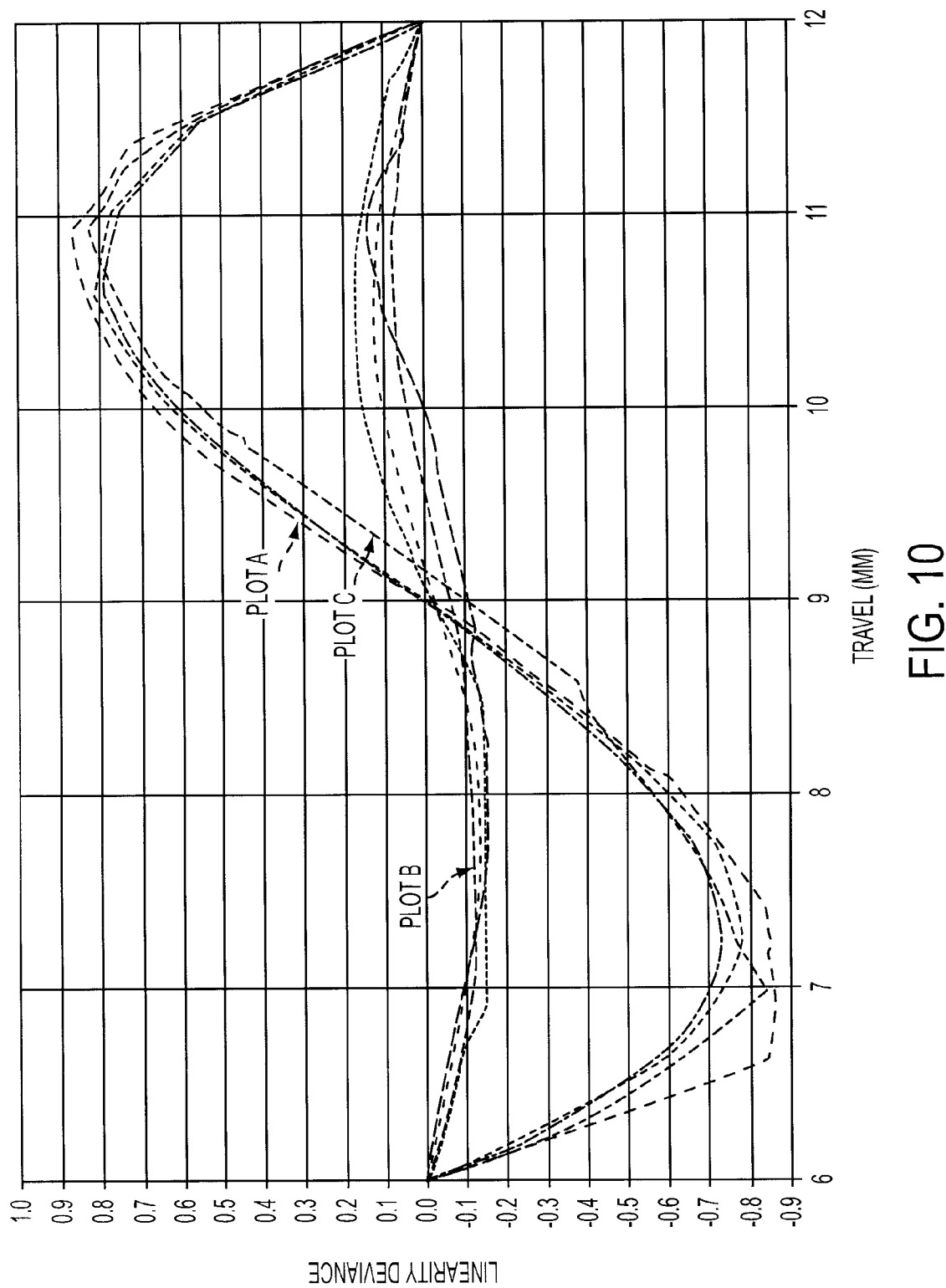
FIG. 10 is a plot of Linear Deviance versus Travel for each of the repelling field position sensor arrangements depicted in FIGS. 6 through 8.

FIGS. 9 and 10 present theoretical performance results of the theoretical models accordingly to FIGS. 6 through 8. Accordingly, the performance of other theoretical models, and physical embodiments, may differ substantially from the modeled performance presented in FIGS. 9 and 10. FIG. 9 is a plot of Axial Gauss versus Travel for each of the embodiments, PLOT A, PLOT B, and PLOT C, depicted in FIGS. 6 through 8. As shown in FIG. 9, and further illustrated in graph of Linearity Deviance versus Travel shown in FIG. 10, the repelling magnetic field position sensor arrangement including magnetic field alignment devices associated with each magnet, depicted in FIG. 7 and designated as PLOT B, exhibits greater linearity of axial gauss along the travel of a Hall device between the magnets, as compared to either of the comparative embodiments depicted in FIGS. 6 and 8, respectively designated as PLOT A and PLOT C.

Consistent with the foregoing, according to one aspect of the present disclosure, there is provided a position senor. The position sensor may include at least two magnets that are spaced apart from one another along an axis. The magnets may be oriented to provide repelling magnetic fields. A magnetic field sensor may be at least partially disposed within the repelling magnetic fields of the first and second magnets. The magnetic field sensor and the first and second magnets may be movable relative to one another along the axis. The magnetic field sensor may further provide an output that is indicative of a position of the magnetic field sensor within the repelling magnetic fields.

According to another aspect, the present disclosure may provide a load sensor. The load sensor may include a housing and a magnet carrier that is disposed at least partially within the housing. The magnet carrier may be movable within the housing in response to an applied load. The load sensor may further include a first and a second magnet coupled to, and movable with, the magnet carrier. The first and second magnets may be coupled to the magnet carrier in an axially spaced apart arrangement, and may be oriented to provide repelling magnetic fields. The load sensor may also include a magnetic field sensor. The magnetic field sensor may be disposed at least partially between the first and second magnets and may be at least partially within the repelling magnetic fields. The first and second magnets may be axially movable relative to the magnetic field sensor, and the magnetic field sensor may provide an output indicative of a position of said first and second magnets relative to the magnetic field sensor.

According to yet another aspect of the present disclosure, there is provided a method of sensing hitch bar load. The method include providing a first and second magnet, in which the first and second magnets are spaced apart along an axis and oriented to provide repelling magnetic fields. The method further includes positioning a magnetic field sensor at least partially between the first and second magnets and moving the first and second magnets and the magnetic field sensor relative to each other along the axis in response to an applied load and providing an output of the magnetic field sensor indicative of a position of the magnetic field sensor relative to the first and second magnets.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

What is claimed is:

1. A position sensor comprising:
   at least two magnets spaced apart along an axis, said magnets being oriented to provide repelling magnetic fields; and
   a magnetic field sensor at least partially disposed within said repelling magnetic fields;
   said magnetic field sensor and said at least two magnets movable relative to one another along said axis, and biased toward a first position relative to one another with a bias; and
   said magnetic field sensor providing an output indicative of a position of said sensor within the repelling magnetic fields in response to being moved away from said first position and toward said bias by a load applied against said bias.

2. A sensor according to claim 1, wherein said at least two magnets and said magnetic field sensor are biased toward a first position relative to one another.

3. A sensor according to claim 2, further comprising a compression spring to provide said bias.

4. A sensor according to claim 1, wherein said at least two magnets are coupled to a magnet carrier for moving said magnets relative to said magnetic field sensor.

5. A sensor according to claim 4, further comprising a plunger coupled to said magnet carrier for moving said magnets relative to said magnetic field sensor.

6. A sensor according to claim 5, further comprising a housing, said magnet carrier being axially movable in said housing relative to said magnetic field sensor.

7. A sensor according to claim 1, wherein said magnetic field sensor comprises a Hall effect sensor.

8. A sensor according to claim 1, wherein at least one of said magnets comprises a magnetic field alignment device associated therewith.

9. A load sensor comprising:
 a housing;
 a magnet carrier disposed at least partially within said housing and biased toward a first position with a bias, said magnet carrier axially movable within said housing in response to an applied load against said bias;
 a first and second magnet coupled to, and movable with, said magnet carrier, said first and second magnets being axially spaced from one another, and said magnets oriented to provide repelling magnetic fields; and
 a magnetic field sensor disposed between said first and second magnets and at least partially within said repelling magnetic fields, said first and second magnets being axially movable relative to said magnetic field sensor;
 said magnetic field sensor providing an output indicative of a position of said first and second magnets relative to said magnetic field sensor, in response to said magnet carrier being moved away from said first position and toward said bias by said applied load.

10. A load sensor according to claim 9, further comprising a spring to provide said bias, thereby biasing said magnet carrier toward said first position relative to said magnetic field sensor.

11. A load sensor according to claim 9, further comprising a plunger coupled to said magnet carrier, said plunger configured to move said magnet carrier in response to a load applied to said plunger.

12. A load sensor according to claim 9, wherein said magnet carrier defines an opening between said first and second magnets and said magnetic field sensor is at least partially disposed within said opening.

13. A load sensor according to claim 12, wherein said magnet carrier comprises slots at opposed ends of said opening, said first and second magnets disposed in respective ones of said slots.

14. A load sensor according to claim 9, said housing and said magnet carrier comprising cooperating alignments features, said alignment features resisting twisting movement of said magnet carrier relative to said housing.

15. A load sensor according to claim 14, wherein said cooperating alignment features comprise a peg and a slot configured to receive at least a portion of said peg.

16. A load sensor according to claim 9, wherein said magnetic field sensor is disposed in an electronics package at least partially disposed in said housing.

17. A method of sensing hitch bar load comprising:
 providing a first and second magnet, said first and second magnets spaced apart along an axis and oriented to provide repelling magnetic fields;
 positioning a magnetic field sensor at least partially between said first and second magnets;
 biasing said first and second magnets toward a first position relative to said magnetic field sensor with a bias;
 moving said first and second magnets and said magnetic field sensor relative to each other along said axis in response to an applied load against said bias; and
 providing an output of said magnetic field sensor indicative of a position of said magnetic field sensor relative to said first and second magnets, in response to said first and second magnets being moved away from said first position and toward said bias by said applied load.

18. A method according to claim 17, wherein said biasing is performed with a spring.

19. A method according to claim 17, wherein said first and second magnets are coupled to a magnet carrier movable relative to said magnetic field sensor.

20. A method according to claim 19, further comprising coupling said magnet carrier to a hitch bar for moving said magnet carrier in response to a load applied to said hitch bar.

* * * * *